United States Patent [19]

Axon

[11] Patent Number: 5,465,496
[45] Date of Patent: Nov. 14, 1995

[54] MEASURING APPARATUS AND METHOD

[75] Inventor: Allan Axon, Leicestershire, England

[73] Assignee: System E. Controls Limited, Warwickshire, England

[21] Appl. No.: 193,157

[22] Filed: Sept. 21, 1992

[86] PCT No.: GB92/01737

§ 371 Date: Feb. 10, 1994

§ 102(e) Date: Feb. 10, 1994

[87] PCT Pub. No.: WO93/06431

PCT Pub. Date: April 1, 1993

[30] Foreign Application Priority Data

Sep. 19, 1991 [GB] United Kingdom ............. 9120029

[51] Int. Cl.$^6$ ............. G01B 5/012; G01B 5/20; G01B 5/004
[52] U.S. Cl. ............. 33/522; 33/552; 33/554; 33/543; 33/1 M
[58] Field of Search ............. 33/522, 549, 550, 33/551, 552, 1 M, 553, 554, 555, 503, 504, 505, 543

[56] References Cited

U.S. PATENT DOCUMENTS

| 2,755,587 | 7/1956 | Hirst | 33/551 |
|---|---|---|---|
| 3,499,227 | 3/1970 | Krause et al. | 33/554 |
| 3,834,032 | 9/1974 | Sihvonen | 33/550 |
| 4,166,323 | 9/1979 | Maag | 33/551 |
| 4,369,581 | 1/1983 | Lenz | 33/503 |
| 4,483,079 | 11/1984 | Band et al. | 33/503 |
| 4,653,196 | 3/1987 | Moschner et al. | 33/552 |
| 4,807,152 | 2/1989 | Lane et al. | 33/1 M |
| 4,953,306 | 9/1990 | Weckenmann et al. | 33/552 |

FOREIGN PATENT DOCUMENTS

| 0026621 | 4/1981 | European Pat. Off. . | |
| 0157176 | 10/1985 | European Pat. Off. . | |
| 2197478 | 5/1988 | United Kingdom | 33/554 |

OTHER PUBLICATIONS

Patent Abstracts of Japan, vol. 6 No. 245 (P-159) (1123) Dec. 1982 re: JP-A 57 142,510.

Primary Examiner—Christopher W. Fulton
Attorney, Agent, or Firm—Cushman Darby & Cushman

[57] ABSTRACT

A measuring system for measuring dimensions of an article such as a bottle has two opposed measuring heads each having a measuring probe, a contact identifying trigger operated by the probe, a base upon which the article to be measured stands, and first and second stepper motor assemblies. The stepper motor assemblies move the measuring heads horizontally and vertically. The base is angularly movable about an axis normal to the plane of the base so as to rotate an article standing on the base so that the different parts of the article are brought into a measuring plane defined as the plane in which the measuring heads move. The measuring probes then measure that part of the article lying in the measuring plane.

7 Claims, 4 Drawing Sheets

MEASURING APPARATUS AND METHOD

This invention relates to apparatus and method for measuring articles, such as bottles.

It is known to measure the dimensions of a bottle to ensure that it is a predetermined size, within predetermined tolerances. It is clearly important that the open-ended top of a bottle be of the correct size to co-operate with a cap or lid for the bottle, that the bottle be perpendicular to its vertical axis (or in some other predetermined orientation) so that the open top is at the correct position when the bottle is moved to a filling station, and that any label-receiving surface on the bottle is correctly sized and orientated. Many other parameters and features may need to be measured.

At present bottles coming off a production line are measured by hand by a skilled quality control operator. The measurer measures selected dimensions using a hand-held measuring device, which could be calipers, a micrometer, or an electronic measuring device. When measuring non-rigid bottles, such as plastics bottles, the pressure exerted by the operator on the bottle when measuring it can deform the bottle and affect the reading. This increases the skill needed to measure the articles.

It is known to measure articles in three-axis measuring devices which have a measuring probe which is adapted to move along three different axes to enable any dimension to be measured. The probe is usually mounted on a massive granite block so as to keep the test bed rigid and so as to be sure of the position of the probe relative to a zero position (0, 0, 0). The (x, y, z) co-ordinates of any part of the article can then be measured and the distance between two measuring positions can give the diameter of the neck of a bottle. Three-axis measuring machines are very expensive.

The aim of the present invention is to provide another measuring device and method suitable for measuring the dimensions of articles.

According to a first aspect of the invention we provide a measuring apparatus for measuring dimensions of an article comprising a measuring head having a measuring probe, a contact-identifying trigger operated by the probe, a base upon which the article to be measured stands, and first and second drive means adapted to move the measuring head along respective first and second directions, the first direction being parallel to the plane of the base and the second direction being inclined relative to the first direction, and in which the base is angularly movable about an axis normal to plane of the base so as to bring portions of an article to be measured into a measuring plane defined by said first and second directions, the arrangement being such that different portions of the article can be brought into the measuring plane.

Such apparatus can be made much more cheaply than a three-axis measuring device.

Preferably the apparatus has two opposed measuring heads, which are most preferably movable in said first direction along the same straight line.

The first and second directions are preferably perpendicular, most preferably horizontal and vertical.

The measuring head is preferably driven in one of the said directions by one of the drive means carried on a carriage, the carriage being driven in the other said direction by the other of the drive means.

The drive means may comprise stepper motors.

The measuring probe is preferably pressure sensitive and may comprise a switch.

The measuring probe is preferably angularly movably mounted on the measuring head and is preferably urged in different angular directions when it contacts oppositely facing surfaces.

Preferably the probe is urged along a circumferential arc relating to the measuring head when it contacts a surface when the measuring head is moving along said first direction, and preferably along the same circumferential arc relative to the measuring head when it contacts a surface when the measuring head is moving along said second direction.

The measuring head preferably moves along said first or said second direction only at any one instant.

The measuring probe is preferably an elongate member which is sensitive to angular movement in the measuring plane.

The drive means and measuring probe are preferably controlled and monitored by a computer or other automatic control means. The computer is preferably adapted to operate a predetermined test routine automatically and may show or print out the test results.

According to a second aspect the invention consists in a method of measuring an article comprising the steps of measuring the article along a first direction, measuring the article along a second direction, the first and second directions defining a measuring plane, rotating the article to bring fresh parts of the article into the measuring plane, and measuring the fresh parts along the first and second directions in the measuring plane.

The method is preferably an automatic sequence of movements along predetermined lines in the measuring plane.

The method may also comprise comparing predicted values for predetermined measurement lines with actual measured values and automatically indicating when the two values do not correspond to within predetermined tolerances.

An embodiment of the invention, and a modification of it, will now be described by way of example only with reference to the accompanying drawings of which:

Figure 1:
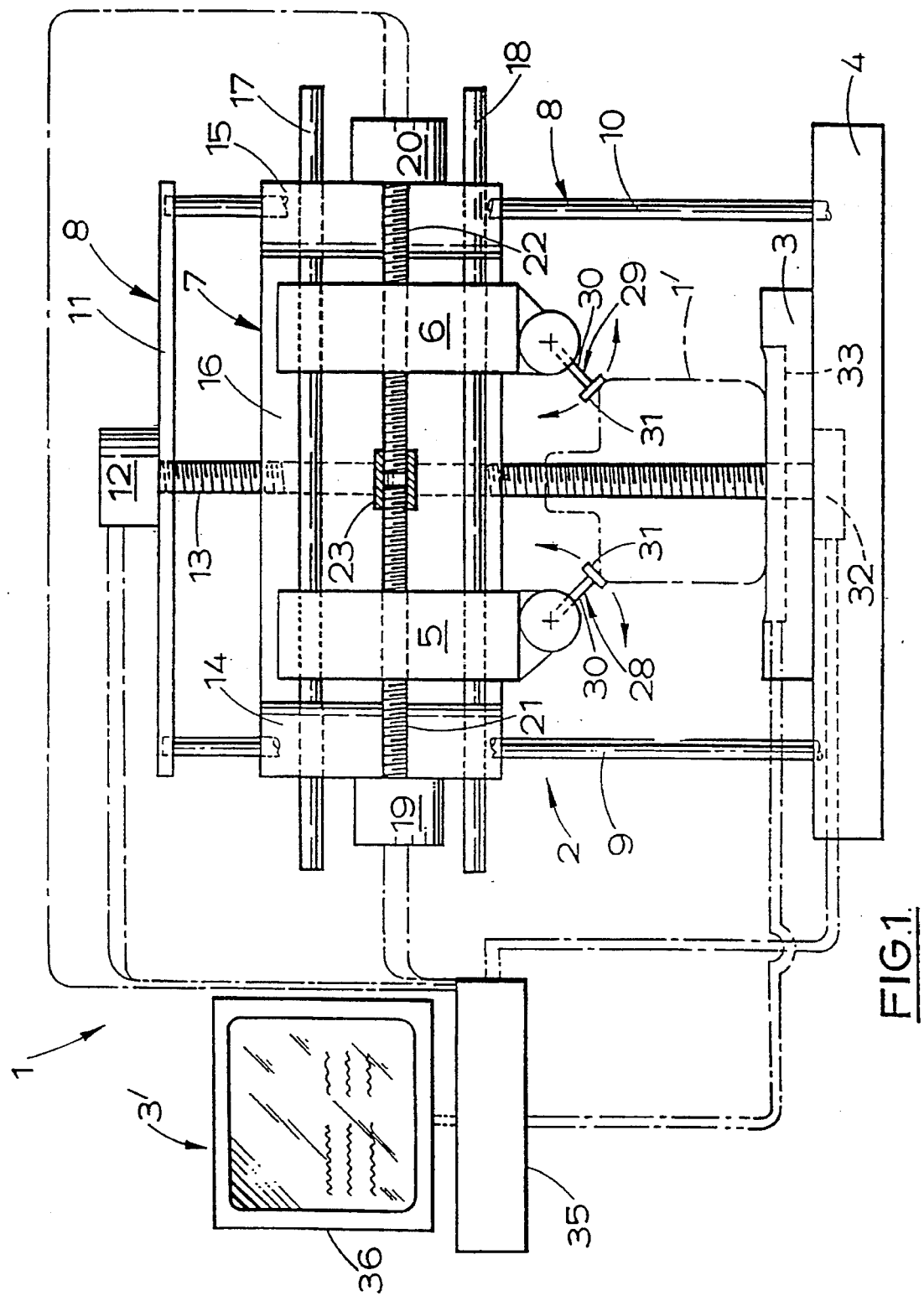
FIG. 1 shows a schematic side view of a measuring system.
Figure 2:
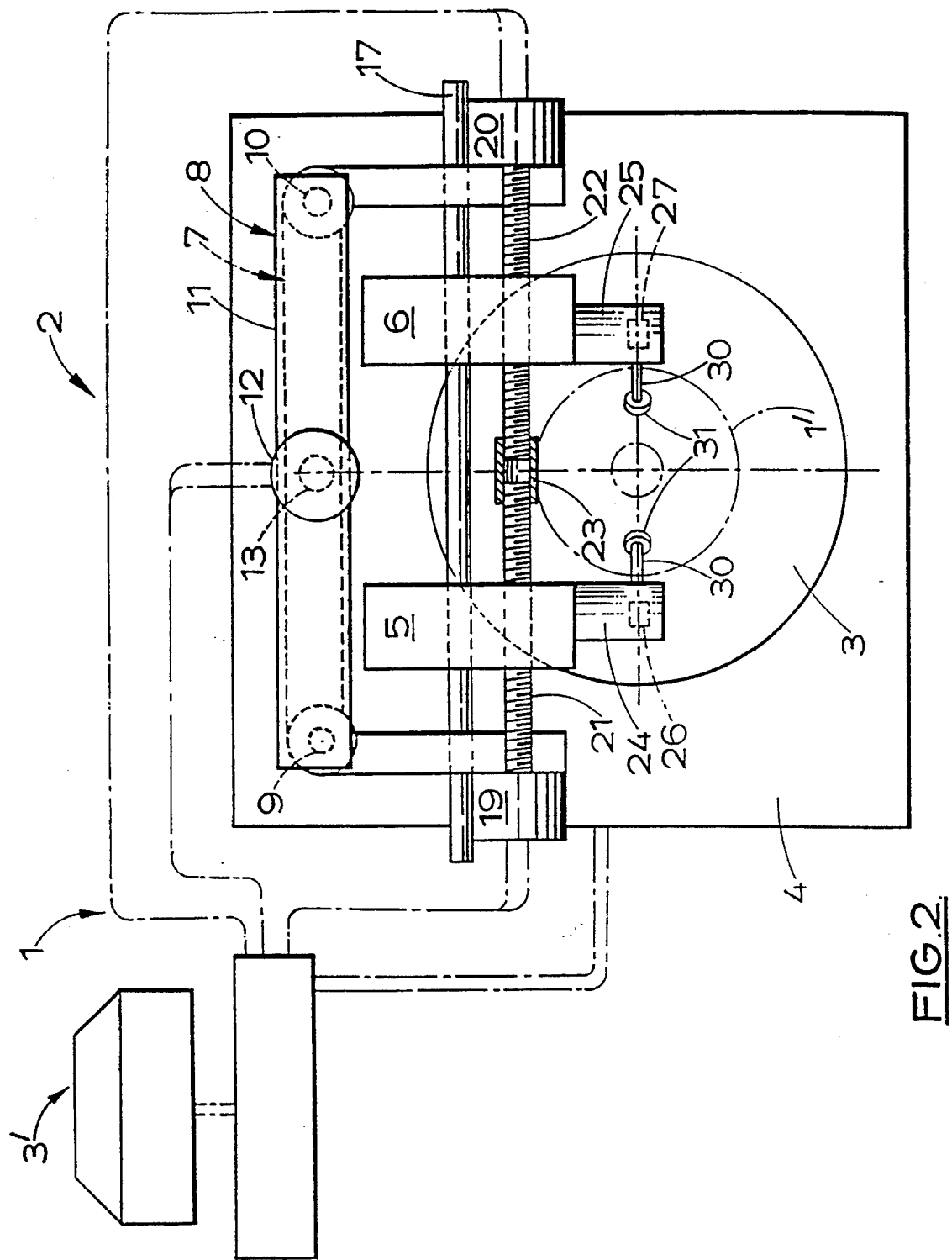
FIG. 2 shows a schematic top view of the measuring system of FIG. 1.
Figure 3:
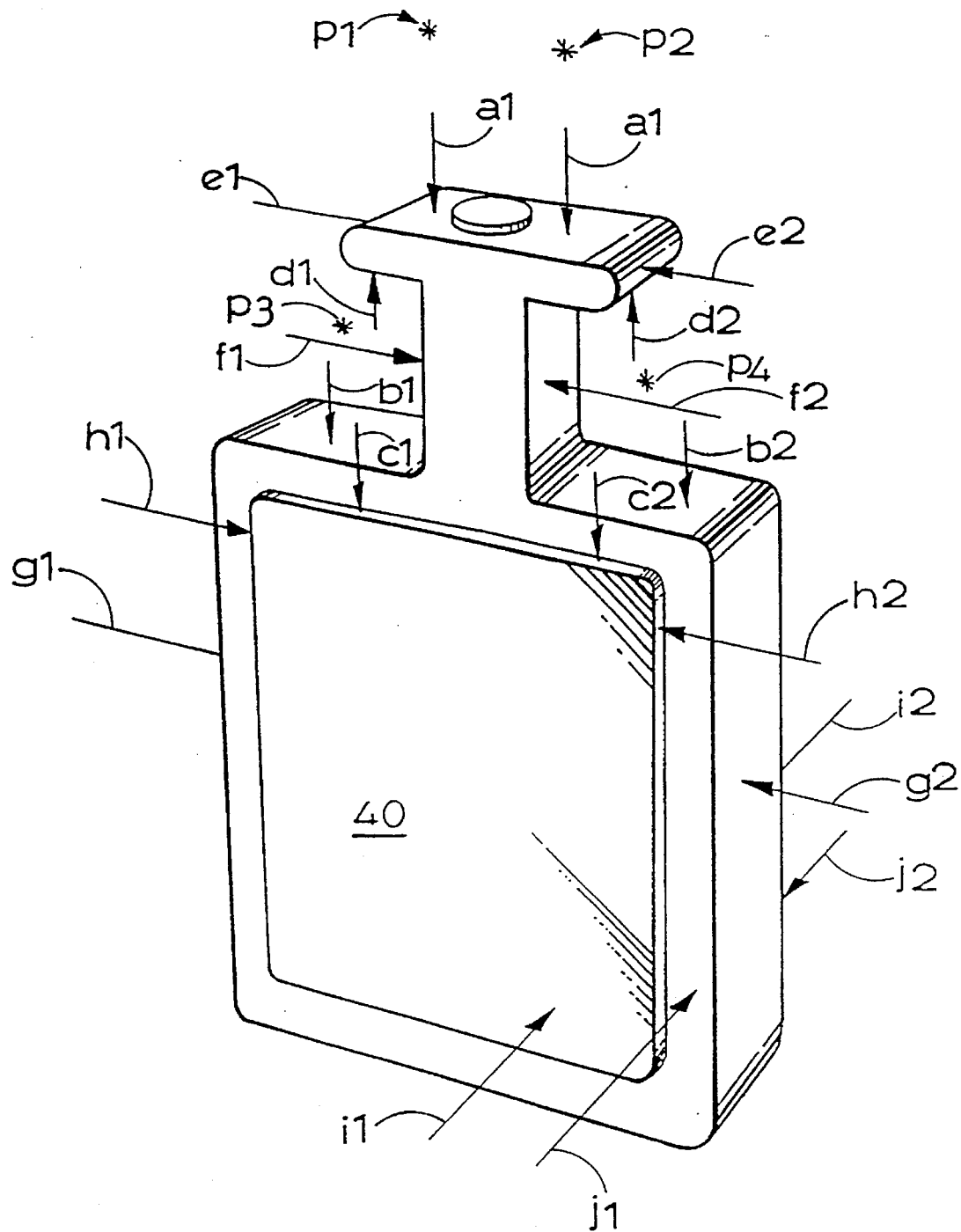
FIG. 3 illustrates an article to be measured.
Figure 4:
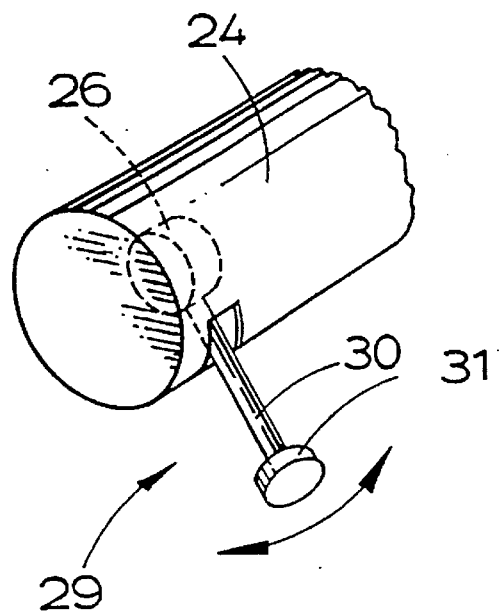

FIG. 4 schematically illustrates a measuring head of the device of FIG. 1; and

Figure 5:
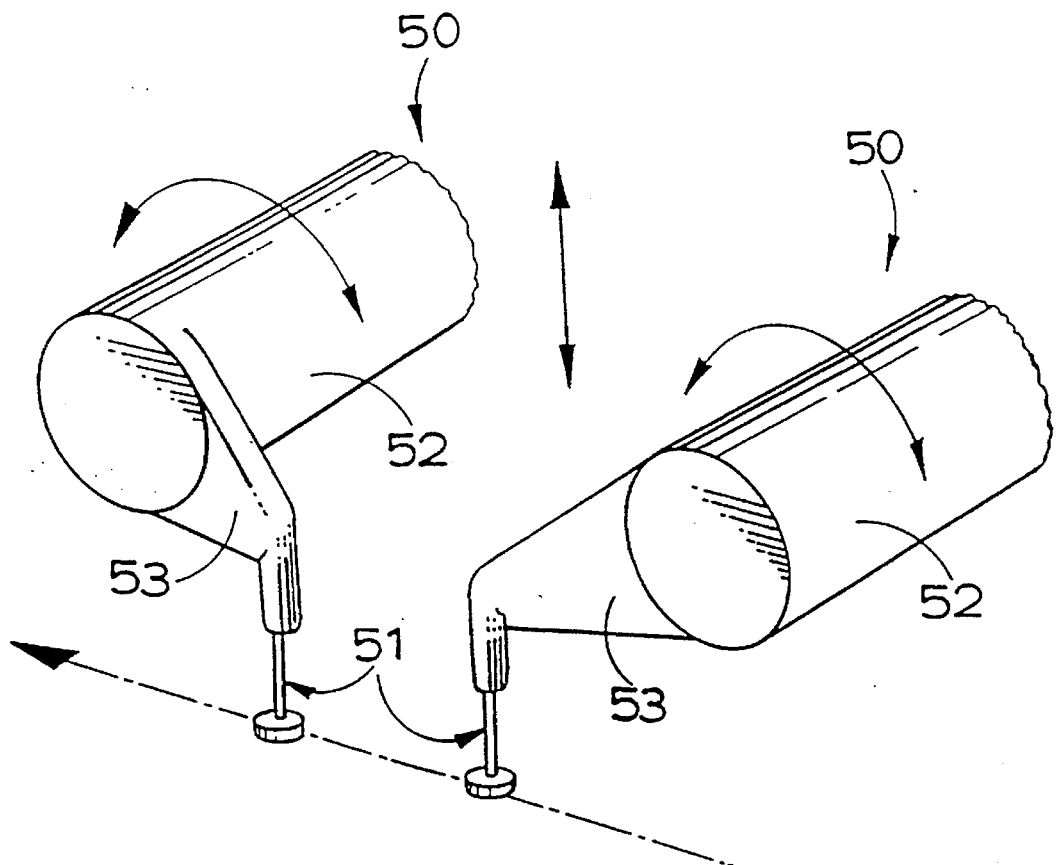

FIG. 5 schematically illustrates modified measuring heads.

FIGS. 1 to 4 illustrate a measuring system 1 for articles 1' comprising a measuring device 2 operated by a computer 3'. The measuring device 2 comprises a base 3 rotatably mounted on a rigid platform 4, and a pair of measuring heads 5 and 6 mounted for horizontal movement on a carriage 7 which is mounted on a support frame 8 for vertical movement.

The support frame 8 comprises two vertical rods 9 and 10 fixed to the platform 4 and joined at their upper ends by a cross-bar 11. A stepper motor 12 is mounted on the cross-bar 11 and controls the rotation of a vertical screw-threaded worm shaft 13 mounted at its upper end at the stepper motor and at its lower end in a bearing in the platform 4. The stepper motor 12 is controlled by the computer 3'.

The carriage 7 comprises two end regions 14 and 15 having central through-bores through which the rods 9 extend, the carriage 7 thereby being guided for vertical movement, and a connecting region 16 connecting the end regions 14 and 15. Two horizontal guide rods 17 and 18 extend between, and are carried by, the end regions 14 and 15. Separately controlled stepper motors 19 and 20 are mounted on the carriage 7 at the end regions 14 15. Two screw-threaded half-shafts 21 and 22 extend horizontally towards each other from the stepper motors 19 and 20 and are coupled together for support at their central ends by a sleeve 23. The half-shafts 21 and 22 are independently driven by the stepper motors.

Each measuring head 5 or 6 has a pair of parallel through-bores through which the guide rods 17 and 18 pass, the measuring heads thereby being guided for horizontal movement relative to the carriage 7. The heads 5 and 6 have screw-threaded means which co-operates with the thread of the respective shaft 21 or 22 to drive the heads along their respective half-shaft. The heads 5 and 6 have projecting cylindrical portions 24 and 25 in which contact switches 26 and 27 are provided. The switches 26 and 27 are activated by movement of contact probes 28 and 29 away from a sprung central, neutral, position. The switches are constant pressure switches requiring about 35 g (about 0.35 N) to activate them. Each probe 28 and 29 comprises an elongate member 30 pivotally mounted on a cylindrical portion 24 or 25 so as to be movable in an arc in a plane defined by the vertical and horizontal directions of movement of the heads 5 and 6. The elongate members 30 have a transverse contact head 31.

The base 3 is rotatable about a central vertical axis and is controlled by another stepper motor, motor 32. The base 3 includes a vacuum chuck 33 (or alternatively a mechanical chuck) which is controlled by the computer 3'.

The computer 3' comprises a keyboard 35, a display screen 36, and a printer (not shown).

A user wishing to check the dimensions of a bottle (for example the bottle 40 shown in FIG. 3) enters the specifications to be measured, and the expected result and acceptable tolerances, into the computer. For example, the user may enter "height a mm"; "height at shoulder b mm"; "height of underside of top flange d mm"; "width of top flange e mm"; "width of neck f mm"; "width of body g mm"; "width of label panel h mm"; "depth of body, including label panel i mm"; and "depth of body excluding label panel j mm". These distances are illustrated on FIG. 3. The user also inputs from where the two probes 28 and 29 are to commence a rectilinear measuring movement.

The user initiates a calibration check (for example by placing a standard block on the vacuum chuck and having the computer measure that). When the system is properly zeroed the user places the bottle 40 roughly at the center of the vacuum chuck 33, as shown in FIG. 1 and then activates the measurement sequence. The computer then automatically activates the vacuum chuck (only those nozzles of it which will grip the bottom of the bottle) and brings the two measuring probes to the positions in which they are to commence their first measuring movement, in this example to a position marked P1 and P2 in FIG. 3. These starting point positions are chosen so as to allow for a degree of mis-centering of the bottle on the base 3. The heads, and probes, are then moved by the stepper motor 12 in respective straight lines (vertically downwards) until their switches 26 and 27 are activated. The switches 26 and 27 are activated by the engagement of the contact heads 31 with the upper surface of the flange at the top of the neck of the bottle as the heads 5 and 6 move downwards causing the probes to pivot upwards and thereby close the switches 26 and 27. The computer records the measurements a1 and a2 (corresponding to positions of the stepper motor 12).

The computer then operates the stepper motors to move the probes to the positions (P3 and P4) from which they will commence the second measurement movement. The probes then move in a straight line until the switches 26 and 27 are activated and the second reading (reading b) taken.

The computer measures the vertical heights coming down, then the vertical heights going up, then the widths e1–e2; f1–f2; g1–g2; and h1–h2. The computer then drives the stepper motor 32 to rotate the base 3, and the bottle 40, to bring the front and rear faces of the bottle into a position where they are at right angles to the horizontal measuring direction. Distances i1–i2 and j1–j2 are then measured.

The probes can, of course, descend into the open mouth of a bottle to measure its internal diameter.

It will be appreciated that the arrangement of the angularly movable probes which pivot either upwards or downwards when they contact a surface enables the same probe to measure in perpendicular directions using the same switch. The same probe can measure in the X and Z axis: it can detect horizontal and vertical surfaces.

When the probes are moved horizontally they are moved in tandem in opposite directions. This has the result that the horizontal forces which they exert are opposed and there is no net resultant force on a centered bottle. During the first horizontal measurement one of the probes may contact the bottle before the other if the bottle is off-center. To avoid the bottle sliding or tilting initially the switches 26 and 27 incorporate stop means which stop the movement of the respective head and probe as soon as the switch closes. The stop means is preferably a mechanical stop. Measurement occurs at the final rest position (centerd) of the bottle. If the centered line of the bottle is not where the computer expects it to be after the first horizontal measurement the computer may adjust its instructions to the stepper motors 19 and 20 to center the following measurements on the experienced center position.

When the measuring sequence is complete the computer checks the measured values to ensure that they are within acceptable tolerances of the expected values. If they are not an alarm is automatically activated.

A print out of the measured values, possibly compared with the expected values, is provided and this accompanies a batch of bottles to a customer to guarantee to the customer their standards. The computer may also be able to display the test history of previous tests for the same bottle type so as to detect any trends, for example a progressive change in a dimension due to mould wear. It could even detect such trends automatically and warn the user of an unacceptable deterioration trend.

The computer is programmed to measure many different bottles, jars, and other containers, the measuring sequence and expected values being accessed by a part reference number.

The stepper motors rotate in steps of 1.8°, which when the thread of their screw-threaded shafts is taken into account means that the probes are moved horizontally and vertically in steps of about 10 µm.

The system can, of course, measure or check articles other than bottles.

FIG. 5 illustrates alternative measuring heads 50 in which a probe 51 is rigidly connected to a central spindle 52 via a kinked arms 53, the entire spindle 50 being moved angularly a slight amount when the probe 51 contacts something.

I claim:

1. An apparatus for measuring dimensions of an article in two inclined directions comprising:

a pair of measuring heads;

a pair of measuring probes each being operatively associated with a respective one of said measuring heads, each of said measuring probes being angularly movable relative to the associated head upon contact with the article to be measured;

a pair of contact-identifying triggers each being operatively associated with a respective one of said measuring probes for indicating contact of said probes with the article to be measured;

a base providing a planar surface upon which the article to be measured can be placed; and first and second drive assemblies, said first drive assembly constructed and arranged to move said measuring heads towards the article in a first direction parallel to the plane of said base to enable the probes to contact the article and thereby actuate said triggers to indicate contact of said probes with the article in a direction parallel to said base, said second drive assembly constructed and arranged to move the measuring heads towards the article in a second direction inclined relative to the first direction to enable the probes to contact the article and thereby actuate said triggers to indicate contact of said probes with the article in a direction inclined relative to said base, said first and second directions residing in a common measuring plane, and said base being rotatable about a central axis normal to the plane of the base so as to bring different portions of the article to be measured into said measuring plane, each measuring probe being constructed and arranged to be movable angularly relative to the measuring head to actuate the associated trigger when it contacts the article as a result of movement of the measuring heads along the first direction, and to be movable angularly in an opposite direction to actuate the associated trigger when it contacts the article as a result of movement of the measuring heads along said second direction.

2. A measuring apparatus according to claim 1, wherein the first and second directions are perpendicular to one another.

3. A measuring apparatus according to claim 1, wherein first and second directions are disposed horizontally and vertically, respectively.

4. A measuring apparatus according to claim 1, further comprising a carriage, and wherein the measuring heads are driven along one of said directions by one of the drive assemblies carried on said carriage, the carriage being driven along the other of said direction by the other of the drive assemblies.

5. A measuring apparatus according to claim 1 in which the drive assemblies comprise one or more stepper motors.

6. A measuring apparatus according to claim 1, wherein the measuring heads move along only one of said first and second directions at any one instant.

7. A measuring apparatus according to claim 1, wherein at least one of the drive assemblies and the measuring probes are controlled and monitored by a computer or other automatic control means.

* * * * *